(12) United States Patent
Sandefur

(10) Patent No.: US 11,142,908 B2
(45) Date of Patent: Oct. 12, 2021

(54) WALL WITH PRE-BENT TUBING

(71) Applicant: THERMAL WALL TECHNOLOGIES, LLC, Evansville, IL (US)

(72) Inventor: Michael Sandefur, Evansville, IL (US)

(73) Assignee: THERMAL WALL TECHNOLOGIES, LLC, Evansville, IL (US)

( * ) Notice: Subject to any disclaimer, the term of this patent is extended or adjusted under 35 U.S.C. 154(b) by 0 days.

(21) Appl. No.: 16/366,625

(22) Filed: Mar. 27, 2019

(65) Prior Publication Data
US 2019/0301156 A1  Oct. 3, 2019

Related U.S. Application Data

(60) Provisional application No. 62/648,791, filed on Mar. 27, 2018, provisional application No. 62/666,146, filed on May 3, 2018.

(51) Int. Cl.
| | |
|---|---|
| *E04B 2/16* | (2006.01) |
| *E04C 1/39* | (2006.01) |
| *E04B 1/16* | (2006.01) |
| *E04B 1/76* | (2006.01) |

(Continued)

(52) U.S. Cl.
CPC ............. *E04C 1/392* (2013.01); *E04B 1/167* (2013.01); *E04B 1/7629* (2013.01); *E04B 2/16* (2013.01); *E04B 2/26* (2013.01); *E04B 2002/0243* (2013.01); *E04B 2002/0245* (2013.01); *E04B 2002/0293* (2013.01)

(58) Field of Classification Search
CPC ... E04C 1/392; E04C 1/00; E04B 2/26; E04B 1/7629; E04B 2/16; E04B 1/167; E04B 2002/0245; E04B 2002/0243; E04B 2002/0293; E04B 2/18; E04B 2/22; E04B 2/8629; F24D 3/12

USPC ...... 52/302.4, 503, 504, 505, 578, 596, 606, 52/506.01, 506.05, 506.06, 506.07, 52/506.08, 506.09, 506.1, 509, 510, 513, 52/597, 598

See application file for complete search history.

(56) References Cited

U.S. PATENT DOCUMENTS

| | | | | | |
|---|---|---|---|---|---|
| 1,329,893 | A | * | 2/1920 | Flynn | ........................ E04B 2/44 52/562 |
| 2,061,822 | A | * | 11/1936 | Bankert | .................... F27D 1/04 52/505 |

(Continued)

FOREIGN PATENT DOCUMENTS

| EP | 0150242 B1 | 7/1987 |
|---|---|---|
| EP | 2921787 B1 | 11/2019 |

OTHER PUBLICATIONS

Apr. 30, 2021 Examination Report issued in Australian Patent Application No. 2019243733.

(Continued)

*Primary Examiner* — Brent W Herring
(74) *Attorney, Agent, or Firm* — Oliff PLC

(57) ABSTRACT

A thermal wall system may include a plurality of blocks configured to interconnect with each other forming a monolithic wall. The plurality of blocks form a series of vertical interior cavities that each extend from a top of the plurality of blocks to a bottom of the plurality of blocks, and tubing vertically extends through the series of vertical interior cavities.

20 Claims, 13 Drawing Sheets

(51) Int. Cl.
*E04B 2/26* (2006.01)
*E04B 2/02* (2006.01)

(56) References Cited

U.S. PATENT DOCUMENTS

| | | | | |
|---|---|---|---|---|
| 2,118,936 A * | 5/1938 | Malinovszky | E04B 2/42 | 52/302.4 |
| 2,153,913 A * | 4/1939 | Blackwell | E04B 2/28 | 52/430 |
| 2,530,940 A * | 11/1950 | Dahlin | E04B 2/42 | 454/185 |
| 3,187,465 A * | 6/1965 | Giuliano | E04C 1/395 | 52/505 |
| 3,559,358 A * | 2/1971 | Lohse etal. | E04F 13/0846 | 52/379 |
| 4,319,440 A * | 3/1982 | Rassias | E04B 2/52 | 52/438 |
| 4,348,845 A * | 9/1982 | Iannarelli | E04C 1/41 | 52/309.9 |
| 4,439,967 A * | 4/1984 | Dielenberg | E04B 2/26 | 52/309.12 |
| 4,597,236 A * | 7/1986 | Braxton | E04B 2/18 | 52/564 |
| 4,622,796 A * | 11/1986 | Aziz | E04B 1/7616 | 52/379 |
| 4,651,485 A * | 3/1987 | Osborne | E04B 2/08 | 52/220.2 |
| 4,856,249 A * | 8/1989 | Nickerson | E04C 1/41 | 52/405.4 |
| 4,869,038 A * | 9/1989 | Catani | E04B 1/4185 | 52/410 |
| 5,086,600 A | 2/1992 | Holland et al. | | |
| 5,299,403 A * | 4/1994 | Fentz | E04B 1/7629 | 52/379 |
| 5,758,464 A * | 6/1998 | Hatton | E04B 1/7675 | 52/404.1 |
| 5,901,520 A * | 5/1999 | Abdul-Baki | E04B 2/16 | 52/421 |
| 5,913,791 A * | 6/1999 | Baldwin | E04B 2/42 | 52/422 |
| 6,725,616 B1 * | 4/2004 | Pease | E04B 1/762 | 52/309.12 |
| 6,843,034 B2 * | 1/2005 | McDonald | E04B 2/16 | 24/570 |
| 7,007,436 B1 * | 3/2006 | Kelley | E04B 2/16 | 52/309.7 |
| 7,546,712 B2 * | 6/2009 | Shaw | E04B 2/04 | 52/223.8 |
| 7,818,938 B2 * | 10/2010 | Lemieux | E04B 2/16 | 52/564 |
| 8,074,419 B1 * | 12/2011 | Humphress | E04B 2/54 | 52/607 |
| 8,635,824 B2 * | 1/2014 | Scherrer | E04B 1/80 | 52/309.16 |
| 8,640,407 B2 * | 2/2014 | Alsayed | E04B 2/54 | 52/220.1 |
| 9,182,133 B1 * | 11/2015 | Weber | E04B 2/42 | |
| 9,435,118 B2 * | 9/2016 | Al-Salloum | E04B 2/18 | |
| 9,476,200 B2 * | 10/2016 | Gomes | E04B 2/22 | |
| 9,482,003 B2 * | 11/2016 | Browning | E04C 1/41 | |
| 9,834,925 B2 * | 12/2017 | Browning | E04C 1/41 | |
| 10,087,623 B2 * | 10/2018 | Browning | E04C 1/41 | |
| 10,094,110 B2 * | 10/2018 | Gomes | E04B 1/30 | |
| 10,301,820 B2 * | 5/2019 | Browning | E04C 1/41 | |
| 10,526,783 B2 * | 1/2020 | Hon | E04C 1/397 | |
| 2003/0140588 A1 * | 7/2003 | Sucato, Jr. | E04B 1/762 | 52/506.01 |
| 2005/0257481 A1 * | 11/2005 | Shaw | E04B 2/16 | 52/606 |
| 2006/0059839 A1 * | 3/2006 | Azar | E04B 2/26 | 52/606 |
| 2006/0150559 A1 * | 7/2006 | Haener | E04B 2/46 | 52/606 |
| 2006/0236645 A1 * | 10/2006 | Holt | E04B 1/41 | 52/715 |
| 2008/0104906 A1 * | 5/2008 | Pyo | E04C 1/397 | 52/223.7 |
| 2008/0307745 A1 * | 12/2008 | Lemieux | E04C 1/395 | 52/745.1 |
| 2010/0043335 A1 * | 2/2010 | O'Connor | E04C 1/00 | 52/592.6 |
| 2011/0252728 A1 * | 10/2011 | Scherrer | E04B 1/7675 | 52/220.1 |
| 2012/0159889 A1 * | 6/2012 | Dyson | E04B 2/48 | 52/503 |
| 2013/0333313 A1 * | 12/2013 | Alsayed | E04B 2/54 | 52/220.1 |
| 2014/0102028 A1 * | 4/2014 | Bethlendy, Jr. | E04C 1/39 | 52/503 |
| 2014/0223848 A1 * | 8/2014 | Binhussain | E04B 2/18 | 52/309.17 |
| 2014/0305062 A1 * | 10/2014 | Heron | E04B 2/40 | 52/438 |
| 2014/0345223 A1 * | 11/2014 | Miks | E04B 1/66 | 52/309.4 |
| 2015/0052837 A1 * | 2/2015 | Gomes | E04B 2/22 | 52/405.3 |
| 2015/0308698 A1 * | 10/2015 | Weber | E04B 2/42 | 52/173.1 |
| 2015/0368901 A1 * | 12/2015 | Weber | E04B 2/42 | 52/220.2 |
| 2016/0145864 A1 * | 5/2016 | Al-Salloum | E04B 2/18 | 52/600 |
| 2017/0247879 A1 * | 8/2017 | Gomes | E04B 1/30 | |
| 2017/0292265 A1 * | 10/2017 | Winter | E04B 2/26 | |
| 2018/0245339 A1 * | 8/2018 | Hon | E04B 2/18 | |
| 2020/0102737 A1 * | 4/2020 | Hon | E04C 1/00 | |
| 2020/0102738 A1 * | 4/2020 | Hon | E04B 2/52 | |

OTHER PUBLICATIONS

May 21, 2021 Office Action issued in Swedish Patent Application No. 2051236-4.

* cited by examiner

WALL WITH PRE-BENT TUBING

CROSS-REFERENCE TO RELATED APPLICATIONS

This application claims the benefit of priority to U.S. Provisional Patent Application No. 62/648,791 and U.S. Provisional Patent Application No. 62/666,146, both of which are incorporated by reference in their entireties herein.

BACKGROUND

1. Field

Some embodiments are related generally to energy efficient construction, such as to a thermal wall technology and construction and assembly method that incorporates hydronic tubing in the thermal mass of the wall through the use of an improved type of interlocking mortarless structural concrete block form, a per-bent polymer water tubing system or air tube system is positioned inside the center of the block, typically the full length of the wall, then concrete or other thermally conducting material is poured into the interspatial connecting cavities of the block to create a monolithic pour. Afterwards insulation and an exterior attachment system is applied.

2. Brief Description of Background

Buildings are constructed from a variety materials and methods. The primary types of construction are wood frame, insulated concrete forms and concrete block.

Wood frame construction typically utilizes 2×4 inch or 2×6 inch lumber to construct a frame. The frame is then reinforced with sheathing materials attached to the exterior and/or interior of the structure. Various types of insulation are inserted between the interior and exterior sheathing. This type of construction has numerous drawbacks; low strength, higher maintenance, shorter building longevity, flammable, low thermal mass, insect damage susceptibility, higher air infiltration, higher allergy concerns and higher heating and cooling costs.

An emerging method of construction is insulated concrete forms (ICFs) which is currently about 10% of the U.S. market. ICFs are comprised of two (typically rectangle) rigid insulation panels separated by a polymer matrix. The two rectangle insulation forms are designed to be stackable with interlocking edges (top, bottom and sides). The cavity between the insulated panels (which is typically between 4 and 8 inches) is filled with concrete forming an insulated concrete wall. Such form systems have limitations on the wall height, as such concrete is then placed in the form and allowed to harden sufficiently before another course of insulating forms are added on top of the existing forms. Such systems result in cold joints between the various concrete layers necessary to form floor-to-ceiling walls or a multi-story building. Cold joints in a concrete wall weaken the wall therefore requiring that the wall be thicker and/or use higher strength concrete than would otherwise be necessary with a wall that did not have cold joints.

ICF technology, however overcomes some of the drawbacks of wood frame construction by providing good strength, less flammable, less infiltration and better allergy concern and reduced heating and cooling costs compared to wood frame and concrete block construction. The drawbacks to ICF construction are high cost of construction and insulation on the interior is susceptible to fire and outgas sing of the insulation can lead to health concerns. Drawbacks aside, ICF construction is considered superior to wood frame construction.

Concrete blocks also known as concrete masonry units (CMU) have been a U.S. staple building material since the early 1900's. CMUs are manufactured regionally throughout the U.S. and provide a low-cost, strong, fire-resistant construction option. CMU blocks come in a variety of dimensions with the standard block being 15-5/8×7-5/8×7-5/8 inches in diameter and typically having one or two cross members (not counting the ends), extending from the top to the bottom in the interior of the block to provide additional strength. CMUs are structural units capable of supporting the building infrastructure, however rebar is required by code in many local jurisdictions. The primary drawbacks of CMUs are cracking along mortar joints and poor insulating features resulting in high heating and cooling cost.

Traditional CMUs are glued together using mortar. The bed and head joints do little for structural integrity, merely adding a heavy mass of mortar to glue the separate blocks together. The results are a substantial amount of non-functioning mass versus overall intended functionality, or structural deficiency. Walls of this type have a tendency to fail exactly on joint lines. Mortared joints do little for overall structural integrity.

Traditional CMUs (being a load-bearing product) have a crossmember feature from top to bottom across the middle of the block. This crossmember results in the creation of individual vertical cells within the wall. To reinforce the wall rebar is inserted in some cells and filled with concrete. This crossmember extending from the top to the bottom of the block however prohibits the diagonal/horizontal flow of concrete to adjacent cells which substantially limits the wall strength when compared to ICFs. Core-filling is not a design function of traditional concrete blocks.

Traditional blocks are designed to be both load-bearing and as lightweight as possible. This lightweight feature (a result of air entrainment in the concrete block) acts as a thermal insulator, interfering with the thermal conductance of the block. This is not a negative feature for CMU construction but is incompatible with the improved technology.

All conventional forms of construction rely heavily on the use of thermal insulation. ICF construction has some thermal mass features, however with the thermal mass isolated by the insulation its benefits are principally negated. Thermal insulation has limitations as it has diminishing returns as R-value increases. In the U.S. around the year 1950, 3.5 inches of fiberglass insulation (R13, or approximately 9 Btu heat loss per square foot) became the standard to reduce heat loss. In the early 2000's the standard shifted to 6 inches of fiberglass insulation (R19, or approximately 6 Btu heat loss per square foot) to further reduce heat loss. Note the nearly doubling of insulation only provided an approximate 30% reduction in heat loss; this is because thermal insulation has limitations as it has diminishing returns with increased thickness/R-value). To achieve an additional 3 Btu per square foot heat reduction would require an R-value of over 40 or well over a foot of insulation. Note for many people in poverty the homes built in the 1950's with 3.5 inches of insulation are now uninhabitable due to the high cost of heating. As energy demands increase with predicted population growth the homes built today in 50-years will very likely also be uninhabitable and insulation, due to its diminishing returns cannot again provide a temporary solution. The purpose of this discussion is to illustrate the limitations of conventional building technologies and to introduce alternative construction components and an improved building method.

SUMMARY

The present invention is now exemplified by a particular embodiment which is illustrated in the accompanying drawings. In particular, the present invention discloses a construction system for the walls of a building. For purposes herein, reference to "walls" or "wall" shall mean the side, back and front walls, and floor of a structure.

According to one embodiment, a thermal wall system may include a plurality of blocks configured to interconnect with each other forming a monolithic wall when filled with concrete or other thermally conductive materials. The plurality of blocks form a series of vertical, interior cavities that each extend from a top of the plurality of blocks to a bottom of the plurality of blocks, and tubing vertically extends through the series of vertical interior cavities.

According to one embodiment, a thermal wall system may include a plurality of blocks configured to interconnect with each other forming a monolithic wall when filled with concrete or other thermally conductive materials. The blocks having the ends reduced in height and the center crossmember further reduced in height so as to form interspatial connecting cavities and interspatial communication between the cells of a block and between the blocks.

According to one embodiment, a method may include: forming a monolithic wall by connecting a plurality of blocks with each other each having interspatial connected cavities, the plurality of blocks forming a series of vertical hollow interior cavities; inserting tubing vertically into the series of vertical hollow interior cavities so that the tubing extends from a top portion of the wall vertically down to a bottom portion of the wall; attaching insulation to an exterior surface of the blocks so as to reflect thermal energy towards an opposing side of the blocks; and after the inserting the tubing and attaching the insulation, filling the vertical hollow interior cavities with a material thereby allowing the material to flow from a first block to other blocks in a direction perpendicular to the vertically-extending portions of the tubing.

According to one embodiment, a system may include a plurality of blocks configured to interconnect with each other forming a monolithic wall, the plurality of blocks forming a series of vertical interior cavities that each extend from a top of the plurality of blocks to a bottom of the plurality of blocks, the vertical interior cavities configured to receive tubing to vertically extend through the series of vertical interior cavities. Each of the plurality of blocks may include a notch configured to receive an alignment grommet and a pair of ridges configured to receive a portion of the grommet when the grommet is installed in a notch of another block. The system may also include an insulation board that is configured to be attached to the grommet, an exterior surface of the blocks.

Figure 1:
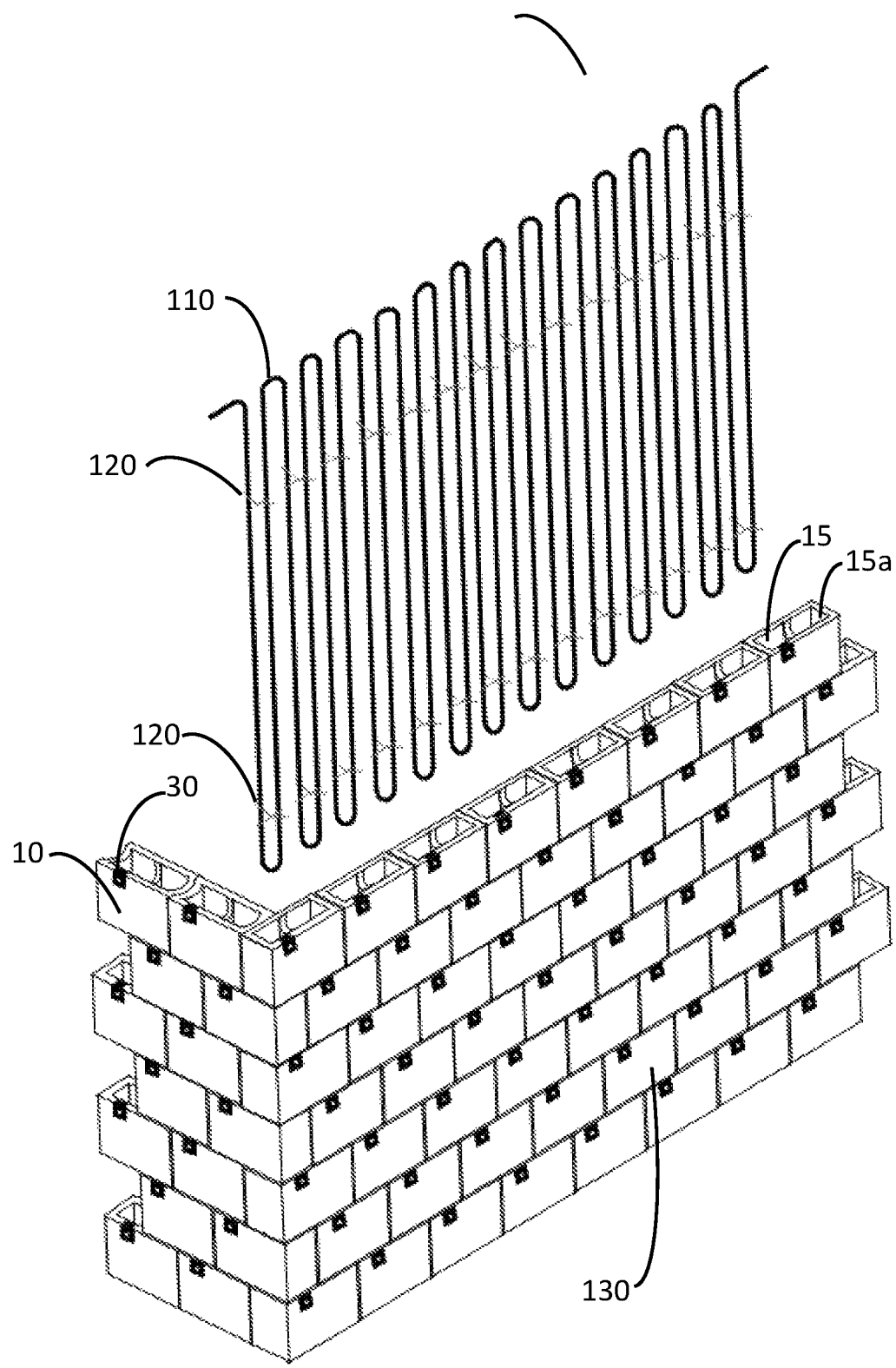
FIG. 1 is an ICB constructed wall with polymer tubing ready for installation according to one embodiment.

Aspects of the present invention is further described in the detailed description which follows in reference to the noted plurality of drawings by way of non-limiting examples of embodiments of the present invention in which like reference numerals represent similar parts throughout the several views of the drawings and wherein:

DETAILED DESCRIPTION

Below is a general overcome of some embodiments.

General Overview

For example, some embodiments provides an improved construction method utilizing interlocking block forms, thermal mass construction, interlocking insulation systems enhancing daily natural heating and cooling cycles and enhancing renewable resources. Some of the methods described herein achieve an ultra-efficient home and building construction system allowing the shell of the home (walls and floors) to act as both a heating and cooling storage system and a heating and cooling delivery system. As a result of the building system described herein, embodiments of the present invention through improved thermodynamics and lower operating temperatures enhances the efficiency of traditional heating and cooling systems between 39 and 60%, hydronic solar collectors by 69% passive solar efficiency by 50-75% and almost eliminates space cooling requirements. Additionally, conventional hydronic solar collectors have only provided hot water and space heat, however this technology can also provide space cooling, to provide both solar heating and cooling. Embodiments of the present invention, due to the building system and method, operate at much reduced operating temperature, this lower operating temperature results in numerous thermal efficiencies. Industrial hot or warm water discharges are common throughout the world. This heated water has no beneficial use and in fact causes negative environmental impacts and/or costs billions of dollars to manage. Embodiments of the present invention have the physical characteristic to be able to utilize this industrial warm water to heat buildings. Embodiments of the present invention utilize accessible thermal mass to ameliorate the temperature in the summer.

The thermal mass assumes the average 24-hour temperature instead of the daily extremes exhibited by low mass structures such as wood frame construction. As such the present invention virtually eliminates the need for space cooling. Embodiments of the present invention also provides a structure that exceeds hurricane standards, reduces infiltration, reduces air infiltration, reduces pollutants which cause allergies, is economically competitive with conventional technology, almost eliminates heating and cooling requirements, enhances efficiency for solar renewable resources, can utilize industrial warm water discharges reducing energy and the carbon and air emissions and sets a template and trajectory toward human sustainable shelter.

The above description introduces a selection of the concepts that are described in further detail in the detailed description and drawings contained herein, but nothing herein is intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

Embodiments of the present invention relates to an energy efficient construction system that in one embodiment, is an insulated concrete block (ICB) form which has unique characteristics of creating interspatial communication between cells of blocks and between blocks, enabling horizontal and diagonal flow of concrete between cells to provide enhance strength and thermal communication, an alignment feature which enables simplified and correct construction methods also providing the ability to dry stack the ICB s, a denser concrete composition to enable critical thermal heat transfer, thinner side walls to provide for lighter ICB, an attachment system for exterior insulation.

An additional embodiment is the inclusion of an alignment grommet which attaches into a notch on the side of the ICB which enables block alignment for quick and accurate construction. It is constructed to accept and receive a pin that locks in place inside the grommet and acts as a support system for the rigid insulation board.

An additional embodiment is an insulation support pin. This pinning system device locks into the grommet and acts as a support and attachment system for the rigid insulation board, which has a second pinning/attachment system on the distal end from the grommet which locks into an insulation retaining channel which holds the ridged insulation board in place.

An addition embodiment is an insulation retaining channel configuration which allows the support pin to snap on flush with the insulation, holding the rigid insulation board in place, while providing an attachment medium for all forms of exterior facades.

An additional embodiment is a rigid insulation board with perforated holes in the same configuration as the ICB grommet matrix whereas insulation support pins are easily inserted into the perforated holes within the grooves on the exterior of the rigid insulation board to accept the insulation retaining channel and be flush with the surface of the rigid insulation board.

An additional embodiment is a pre-bent polymer water tube or air tube in such a configuration so as to be able to be inserted vertically into the cavities of the ICBs so as to provide the walls with thermal heat or cooling. In some embodiments, the material flowing through the tubing can be any material, such as water, air, etc.

An additional embodiment is a tube spacing and guide device configured to snap on the pre-bent polymer water tube or air tube in order to maintain the tubing at a uniform distance apart from each other and to provide a guide system to maintain the tubing at desired distance from the inner cell walls when inserted into the ICBs.

The ICBs are dry stacked after the alignment grommets are installed in the notch in the ICB. Following completion of the ICB wall, the insulation support pins are inserted and locked into the alignment grommets. The rigid insulation board with the perforated holes in the same configuration as the insulation support pins is inserted over the insulation support pins. The insulation retaining channel is then snapped and locked on the exterior end of the insulation support pin locking the insulation in place. The pre-bent polymer water tubing with the tube spacing and tube guide device is lowered into the cells of the ICBs and connected to a water heating/cooling source to affect the temperature of the building. Concrete is then poured into the cells of the ICBs to provide the thermal mass thus effectuating the thermal efficiencies. The chosen exterior façade is then attached to the insulation retaining channel.

As will be seen from the subsequent description, the preferred embodiments of the present invention and method overcome disadvantages of the prior art. In this regard, the present invention discloses a system allowing the walls and floors to provide both traditional heating and cooling and greatly enhance solar heating and cooling in a building that can be controlled evenly, efficiently, with greater flexibly at a lower cost.

Below are some specific embodiments described, but the present invention is not limited to these exemplary embodiments.

Descriptions of Exemplary Illustrative Embodiments

Referring to the drawing, FIG. 1, some embodiments of the present invention are directed to an interlocking mortarless structural concrete block form that is used as insulated concrete blocks (ICBs) 10. Specifically, it will be noted in the following description that the insulated concrete block form of the present invention discloses an ICB block 10 that is relatively easy to assemble, is stronger and does not require mortar between the in the concrete block forms and avoids cold joints in the concrete. The ICB block further enables the insertion of pre-bent polymer water tubes or air tubes 110 and a tube spacing and guide device 120 in the cavities 15 & 15a of the ICB structure. The ICB further provides an attachment system for exterior insulation and accommodates and economically integrates different types of finished wall and/or cladding systems for exterior applications. In the broadest context, the stackable ICBs as disclosed provides an insulated concrete form system consisting of components configured and correlated with respect to each other so as to obtain the desired objective.

Figure 2A:
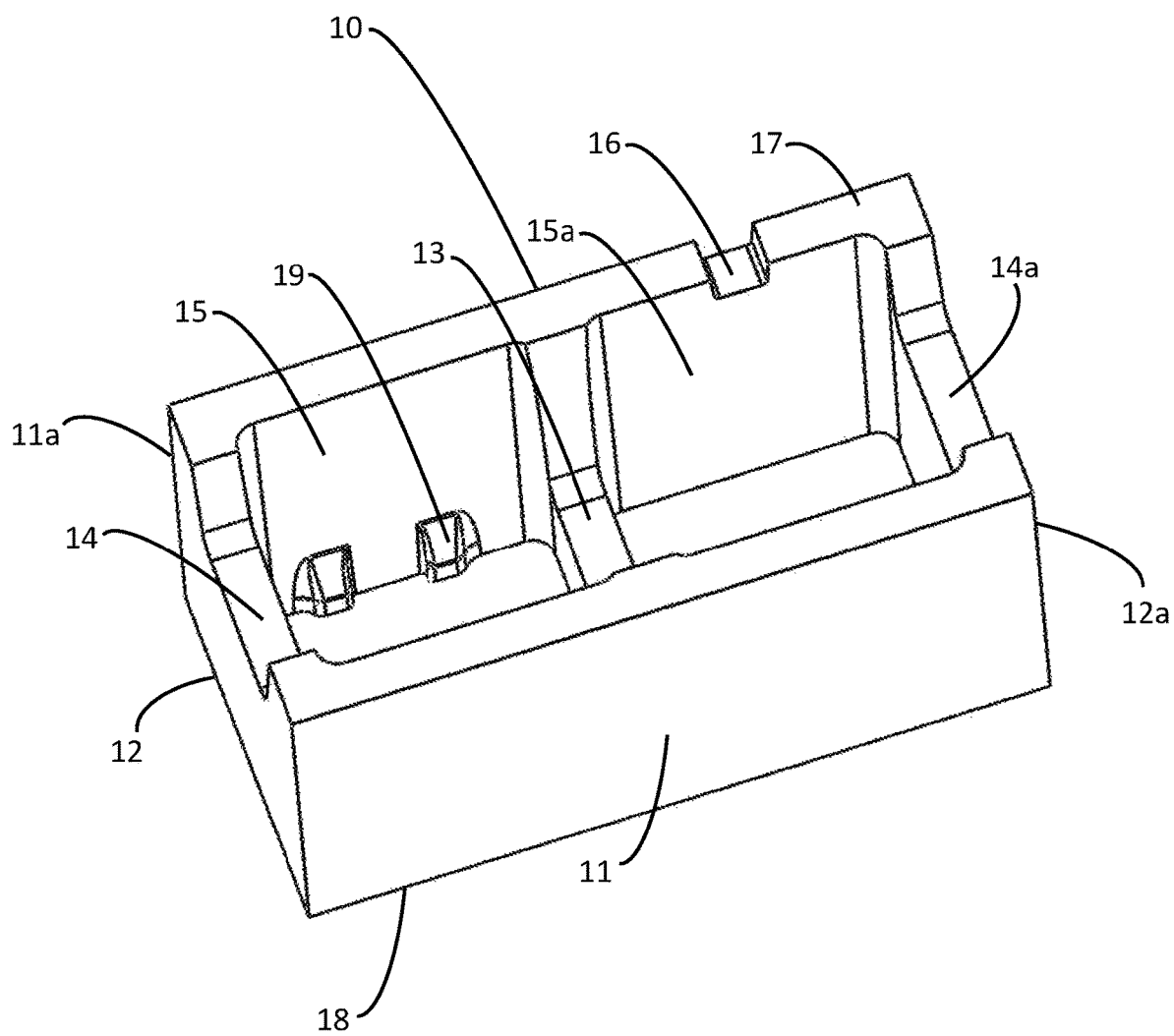
FIG. 2A is an ICB perspective view according to one embodiment.

Referring to FIG. 2A, FIG. 2A discloses an ICB 10 according to embodiments of the present invention. The ICB 10 has two long sides 11 & 11a, two short sides 12 & 12B (ends), a top side 17 and a bottom side 18 and at least one interior crossmember in the center 13 connecting the sides 11 and 11a, providing necessary strength to support the ICB during construction and filling of the cavities 15 and 15a with concrete or other materials configured to create sidewalls, herein after referred to as "concrete". Traditional CMU come in a variety of sizes with the standard being 15-⅝×7-⅝×7-⅝. The standard size of an ICB may be any size, such as 8×8×16 inches and may be dry stacked with or without mortar. The same design principles applied to the standard ICB may be applied to other dimensions of ICB blocks. Unlike traditional CMUs that attempt to balance strength utilizing a lightweight concrete mix actually limit thermal transfer; the ICB 10 may be constructed with a dense thermally conductive material, typically a cementitious material (but is not so limited and can be any material). Other thermally conductive materials may also be functional.

Figure 2B:
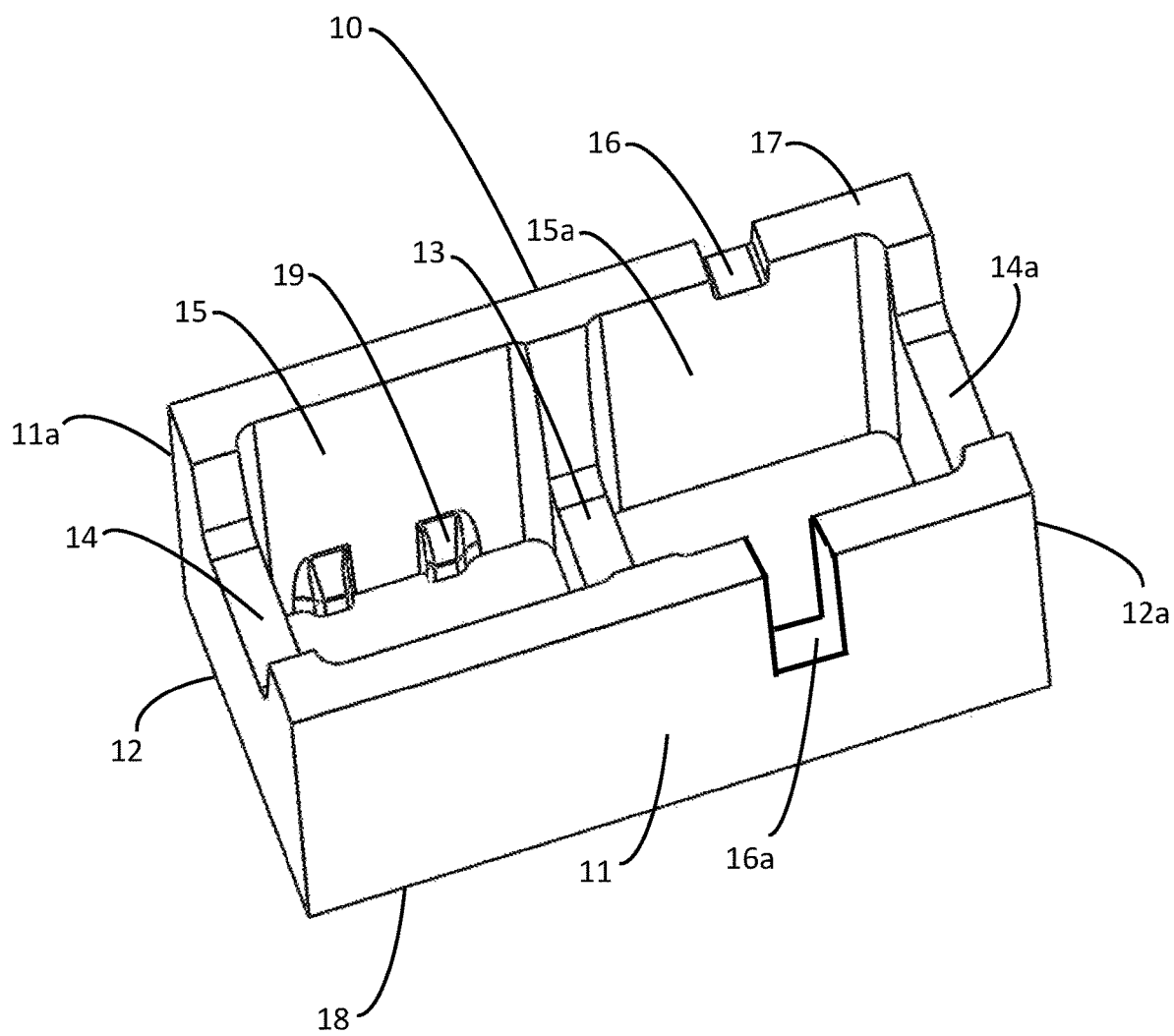
FIG. 2B is an ICB block with a pre-cut receptacle according to one embodiment.

Referring to FIG. 2B, FIG. 2B discloses an ICB block 10 with a precut out 16a for receptacles. The cutout can be configured for one or more receptacles on one or more sides.

Figure 3:
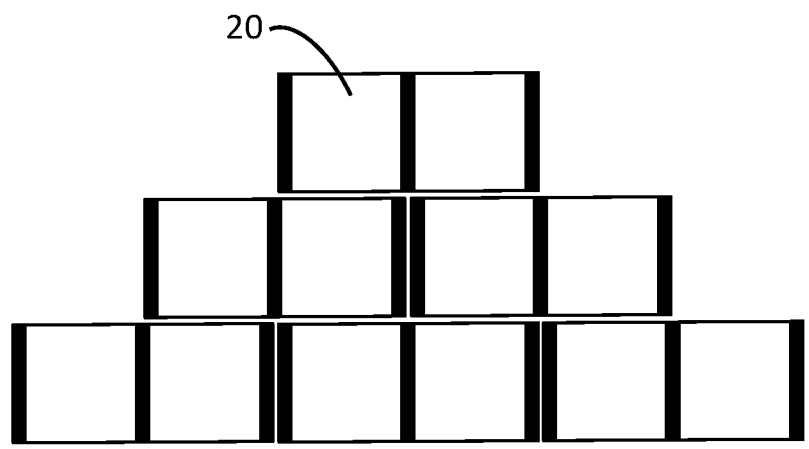
FIG. 3 is an illustration of interspatial concrete communication between a conventional CMU and ICB according to one embodiment.
Figure 3:
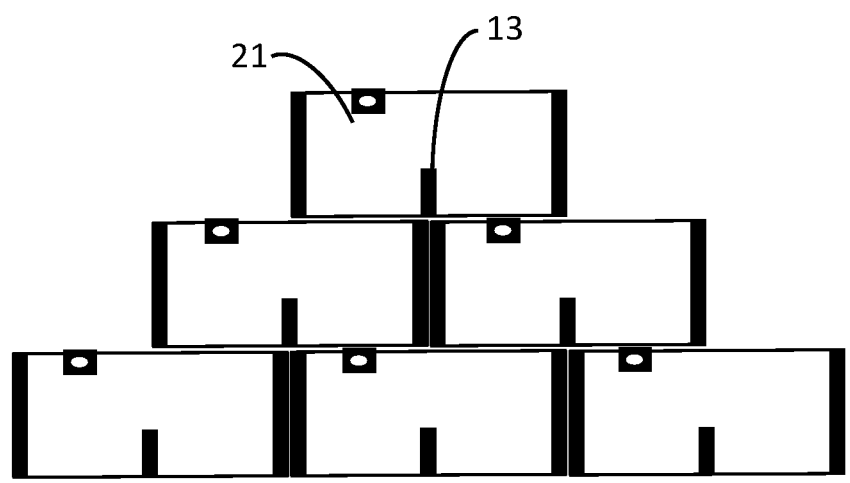

The top side 17 of the ends 12 and 12B are reduced in height 14 and 14a to allow concrete to flow horizontally (from flowing between multiple blocks in a left-to-right or right-to in FIG. 3) for strength, providing outstanding thermal conduction, and ease-for the insertion of rebar or other construction infrastructure. The crossmember 13 is further reduced in height relative to the height of the block to enable the concrete to flow horizontally and diagonally greatly enhancing strength by creating a monolithic fill and providing for thermal conductance throughout the wall system. In other words, as shown in the bottom drawing of FIG. 3, wall 13 only extends part of the way up the block so that the two internal hollow cavities of the block are connected hollow areas that are able to freely and directly communicate material in one hollow area with another.

Referring to the top figure of FIG. 3, reference number 20 represents a cross-sectional view of a conventional CMU stacked wall and the inter-spatial cavities illustrating the vertical and isolated columns with no horizontal or diagonal flow of concrete. In the bottom drawing of FIG. 3, reference number 21 represents a cross-sectional view of an ICB form stacked wall and the inter-spatial cavities illustrating the interspatial connectivity between the ICBs enabling the horizontal and diagonal flow of concrete creating a monolithic wall with superior strength and providing the thermal communication for the technology.

Figure 4:
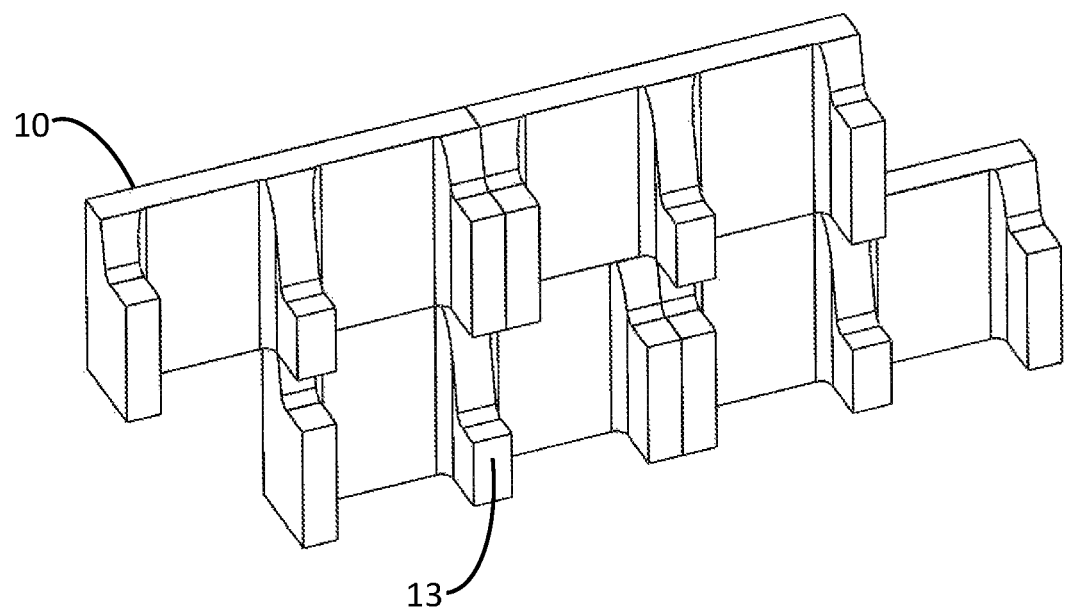
FIG. 4 is an illustration of interspatial concrete communication of the ICB according to one embodiment.

FIG. 4 illustrated a cutaway perspective view of an ICB block wall 10 and the reduced height center crossmember 13 which further illustrates the interspatial communication achieved with the ICB form design.

Figure 5:
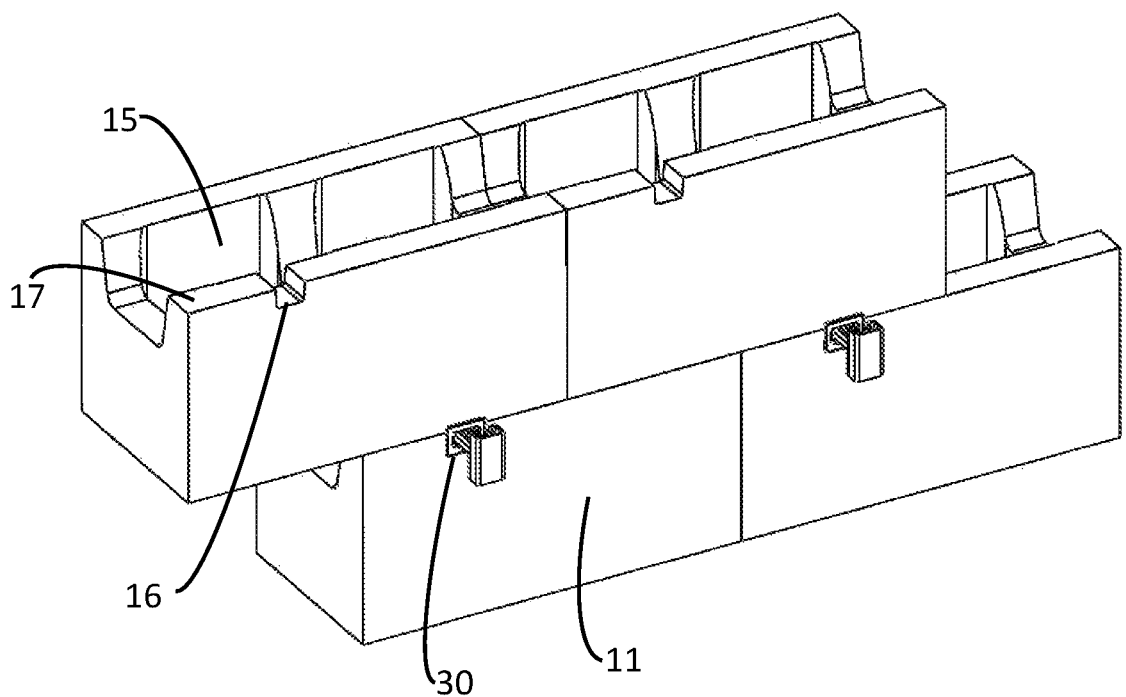
FIG. 5 is an ICB perspective view illustrating the alignment grommet notch according to one embodiment.

Referring to FIG. 5, a notch 16 on the top side 17 in the center of cavity 15 in the ICB is a notch configured with a taper which narrows from the top to the bottom so as to allow for insertion of the alignment grommet 30 with the long axis of the notch running horizonal with the top 17 of side 11 to facilitate proper installment of the alignment grommet 30.

Figure 6:
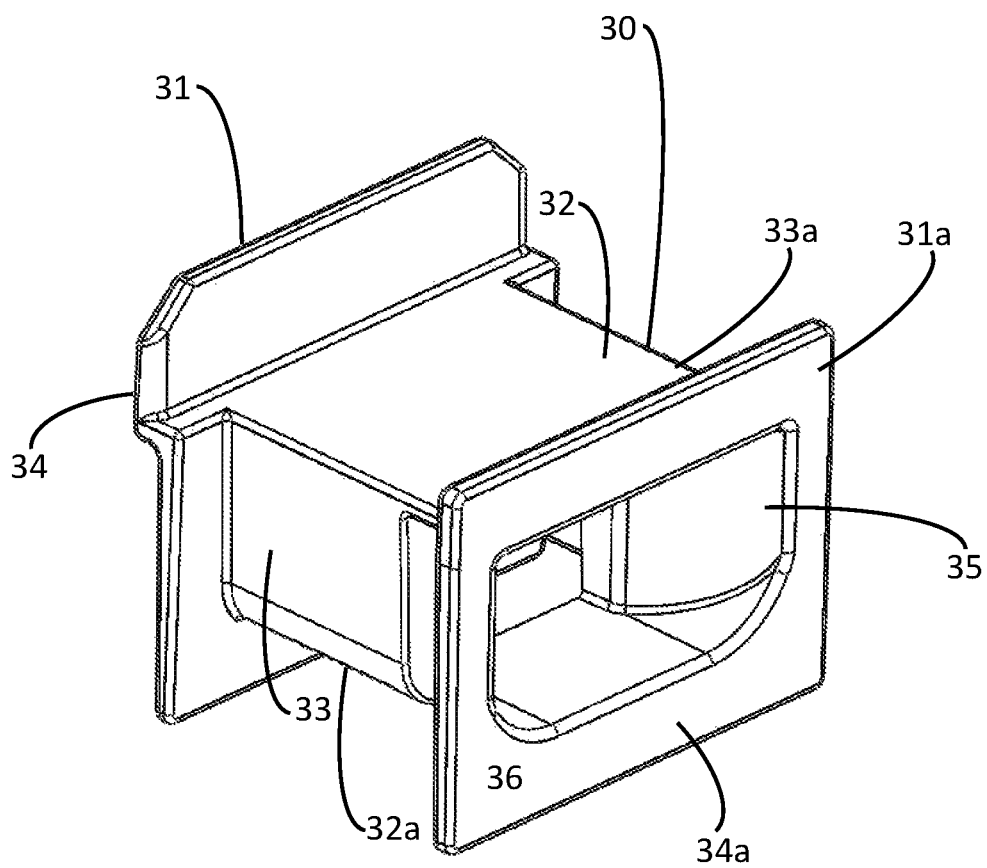
FIG. 6 is a perspective view of the alignment grommet according to one embodiment.

The notch 16, shown in FIG. 5, works in tandem with the alignment grommet 30, shown in FIGS. 6 & 5, to facilitate proper placement and stacking of the ICB 10, shown in FIG. 2A. To further facilitate proper placement and stacking of the ICB 10 horizontally two raised alignment ridges. In FIG. 2A, there are a pair of spaced apart protrusions 19 at the bottom of the ICB in the interior of cell FIG. 2A, 15a on the same side 11 (FIG. 2A) as the notch 16 FIG. 2A. When stacking the ICB FIG. 2A, 10 the flange 31 (FIG. 6) of the alignment grommet 30 seats between the alignment ridges 19 FIG. 2A of the next upward level ICB form.

As shown in FIG. 6, the alignment grommet 30 forms a rectangle with two long sides 32 & 32B, two narrow sides 33 & 33a, an interior flange 31 and an exterior flange 31a and an interior end 34 and an exterior end 34a, with the interior end 34 closed and the exterior end 34a open with a receiving aperture 35. The alignment grommet is configured with a taper on the sides of 32 and 32B, tapering down from top to bottom for easy and correct insertion.

Figure 7:
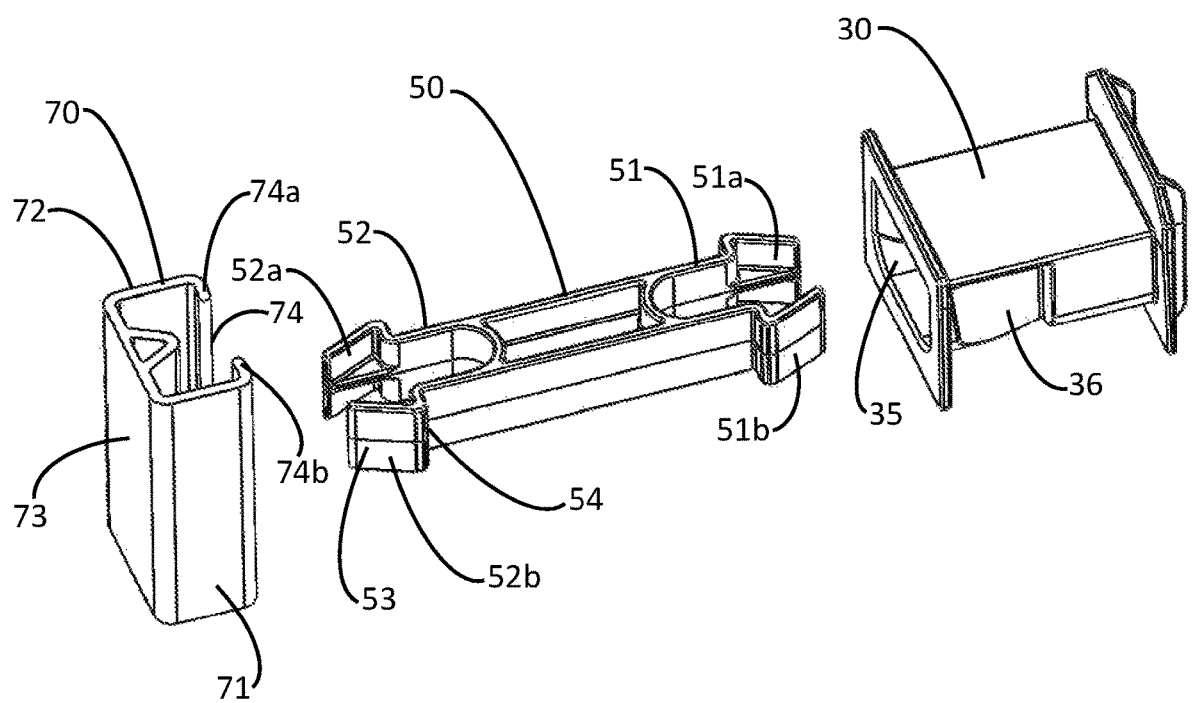
FIG. 7 is a perspective view of the alignment grommet, insulation support pin and insulation retaining channel according to one embodiment.

Referring to FIG. 7, the receiving aperture 35 is configured to receive the insulation support pin 50. Each interior side of the alignment grommet 30 have tapered ramps 36 on each side of the grommet which compresses the insertion appendages 51a and 51b of the insulation support pin 50.

Figure 8:
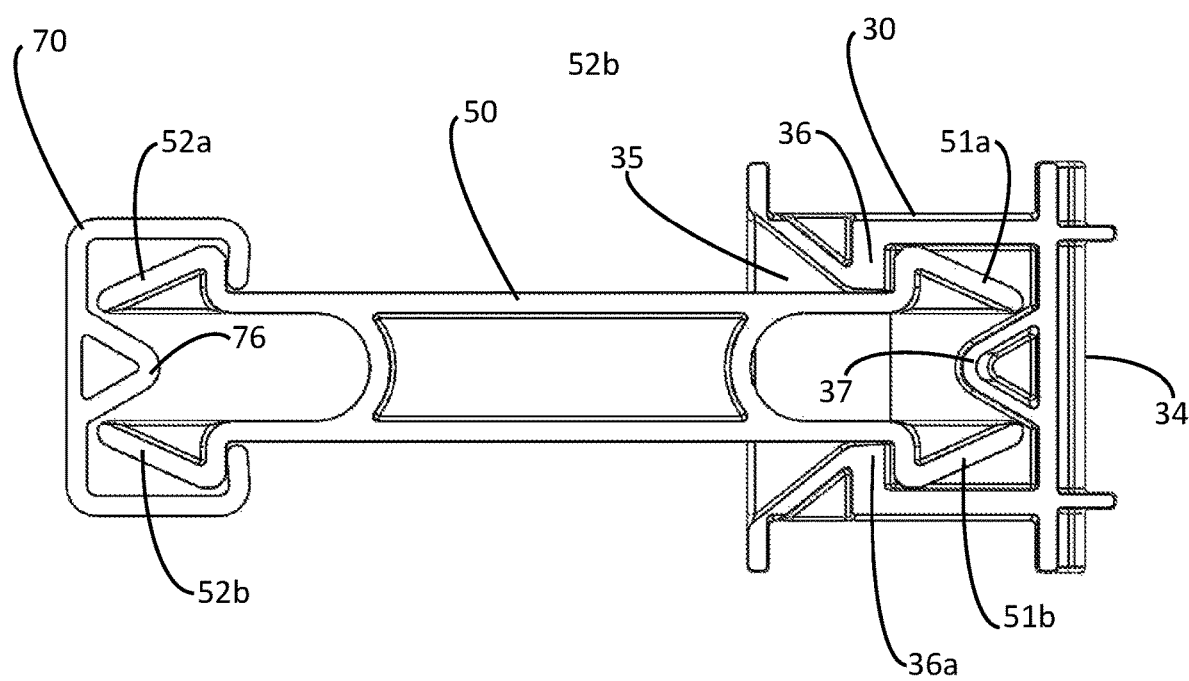
FIG. 8 is a top cutoff view of the alignment grommet, insulation support pin, and insulation retaining channel according to one embodiment.

Referring to FIG. 8, a cut-away view of the alignment grommet 30 and insulation support pin 50, upon full insertion of the insulation support pin into the aperture 35 the tapered ramps 36 & 36a abruptly terminates allowing the insertion appendages 51a & 51b to expand. Concurrently, when the insertion appendages 51a & 51b are inserted into the alignment grommet 30 the ends of the insertion appendages are forced apart by a triangular shaped ridge 37 on the inside of grommet 30 of the interior end 34. Upon expansion the insertion appendages 51a & 51b lock in place.

Figure 9:
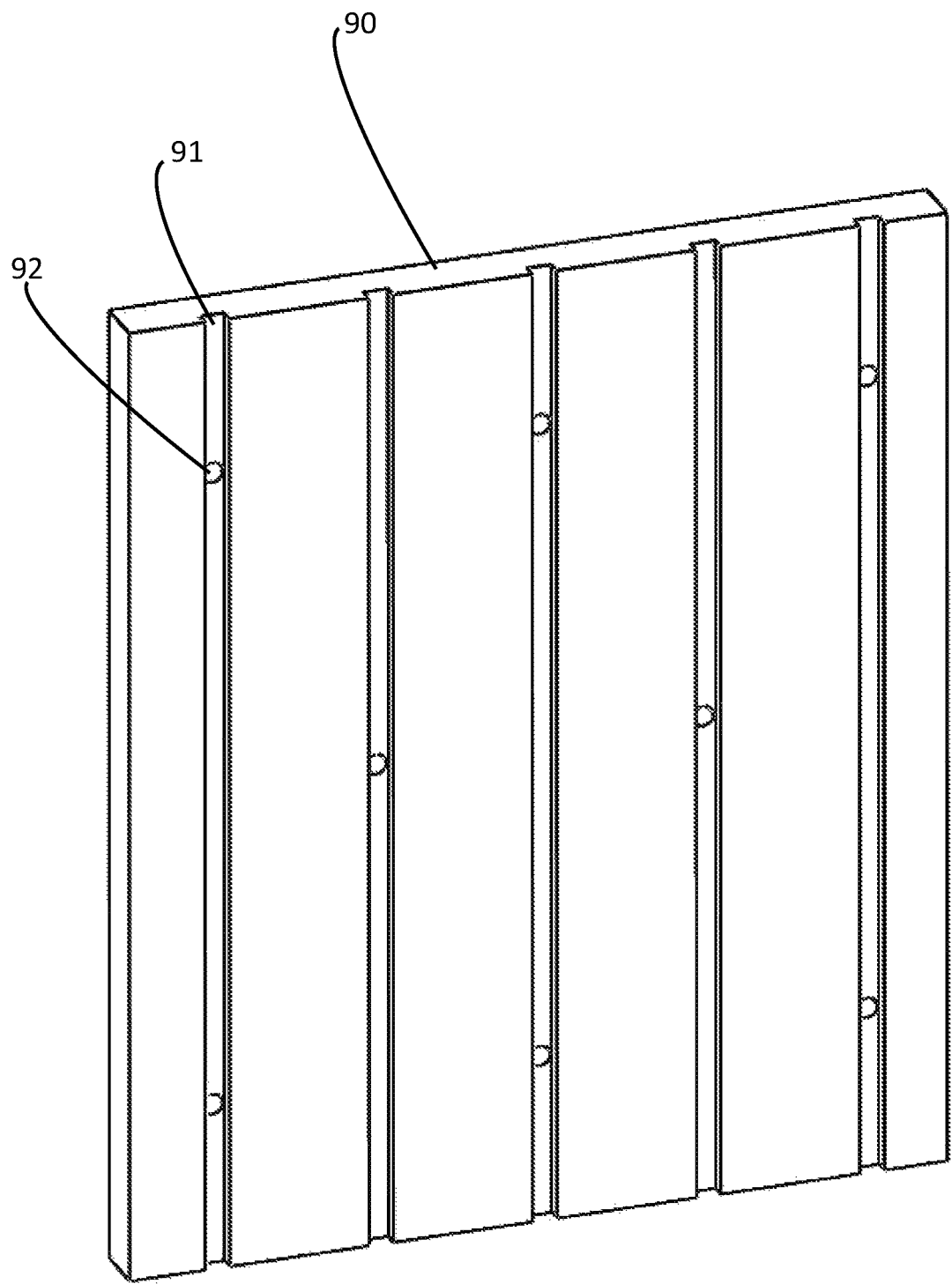
FIG. 9 is a perspective view of the rigid insulation board with apertures and channel cuts according to one embodiment.

Referring to FIG. 7, the insulation support pin 50 may be made of a polymer compound (but not limited to) functions to establish a connection between the alignment grommet 30 and the insulation retaining channel 70, shown in FIG. 9, to securely hold the rigid insulation board in place. The insulation support pins have an interior facing end 51 and two opposing insertion appendages 51a & 51b which insets into the alignment grommet aperture 35 and an exterior facing end 52 which has two insertion appendages 52B & 52b which inserts and locks into the channel of the insulation retaining channel 70. The opposing insertion appendages 51a and 51b and opposing insertion appendages 52B and 52b are designed to flex inward when inserted in to the alignment grommet 30 and the insulation retaining channel 70 when compressed and return to their natural position when not under compression. Each end of the opposing appendages tapers inward 53 with a locking shoulder 54. The length of the insulation support pin 50 will vary with the thickness of the exterior insulation.

Referring to FIG. 7, the insulation retaining channel 70 is preferably constructed of polymer (but not limited to) with the shape of a four-sided rectangle with two narrow sides 71 & 72 an exterior side 73 and an interior side 74. The interior side 74 has a portion of the center face absence exposing a cavity between the exterior side 73 and interior side 74 and between the narrow sides 71 & 72 and forming two opposing lips on the interior side 74a and 74b. The insulation support pin 52 appendages 52B & 52b compress when the appendage face 53 is inserted between the opposing lips 74a & 74b into the cavity 75. When fully inserted the appendages 52B & 52b decompress and the shoulders 54 lock the insulation support pin 50 in place.

Referring to a cut-away view of FIG. 8, concurrently, when the insertion appendages 52B & 52b are inserted into the insulation retaining channel 70 the ends of the insertion appendages are forced apart by a triangular shaped ridge 76 on the interior cavity face of exterior side 73. The ridge 76 also provides additional rigidity to the insulation retaining channel and additional gripping material for screws securing the exterior façade.

Referring to FIG. 9, the length of the insulation retaining channel 70 can vary with the height of the wall and generally installs into a vertical cavity 91 in the rigid insulation board 90 with the width and depth of the insulation retaining channel adequate to appropriately hold the insulation in place and to support selected exterior facades. Following the installation of the rigid insulation board the insulation retaining channel 70 may be snapped on the insulation support pin and the insulation retaining channel medium utilized to secure the exterior facade. The insulation retaining channel may rest on the foundation to further support the exterior façade.

Referring to FIG. 9. the rigid insulation board 90 is comprised of a rigid insulative board material, preferably a polymer matrix insulation, e.g., expand polystyrene or polyisocyanurate, etc. The rigid insulation boards will be of standard sizes, generally 4 feet by 8, 10 and 12 feet lengths with the sizes varying on customer demands, generally one to five inches in thickness. The rigid insulation boards will be pre-perforated with apertures 92 corresponding to the alignment grommets and insulation support pins which are positioned every 16 inches apart per horizonal row with each adjacent row shifted 8 inches as illustrated. The rigid insulation board may have channels cut in the rigid insulation board 90 to receive the insulation retaining channel 70 in order to make it flush with the exterior of the rigid insulation board.

Figure 10:
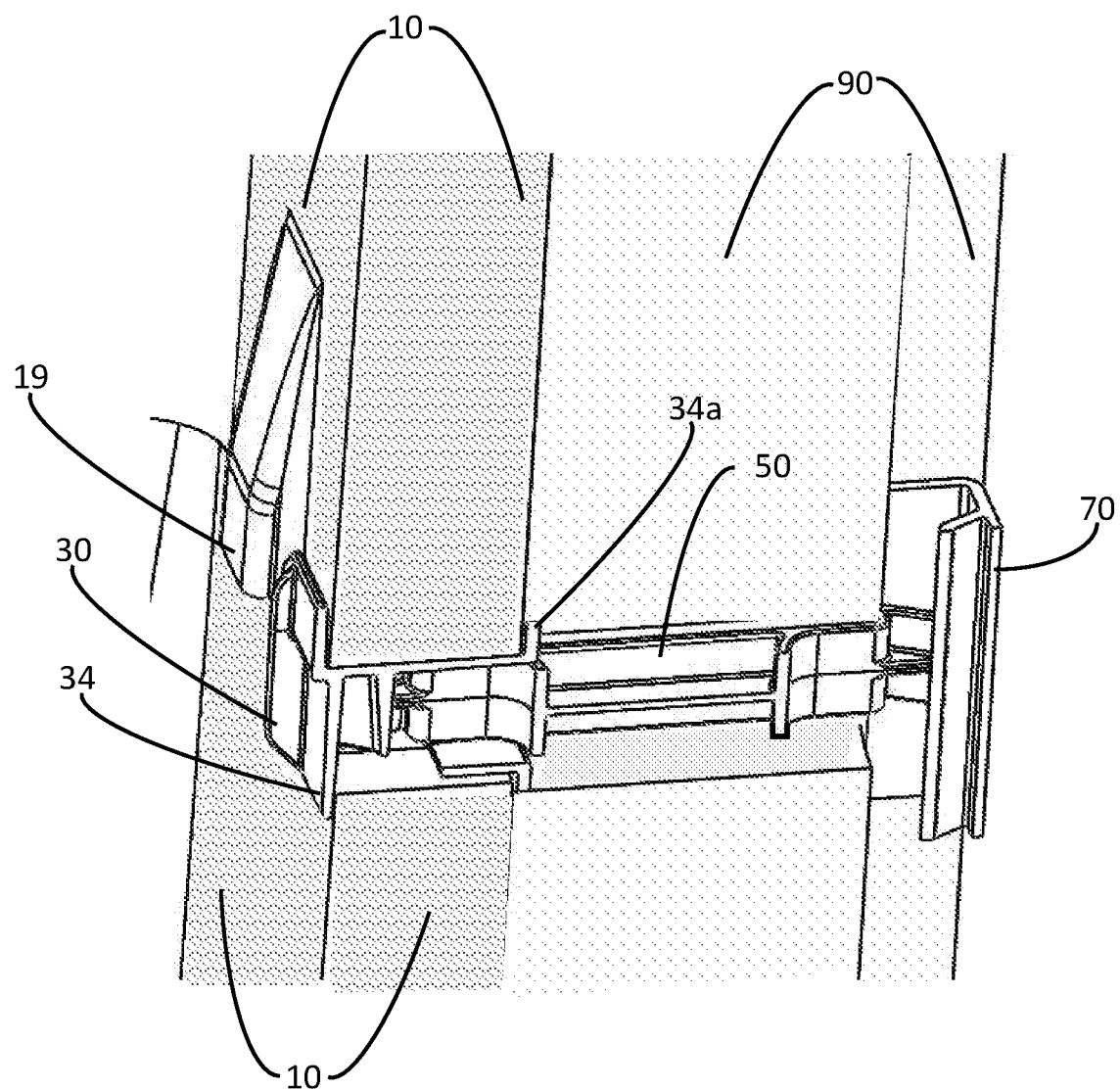
FIG. 10 is a side view cut perspective of the ICB wall assembly according to one embodiment.

Referring to FIG. 10, FIG. 10 illustrates a cutaway view of the insulation retaining assembly unit. The insulation support pins 50 are attached to the alignment grommet 30 then the rigid insulation board 90 with the perforated holes 92 are inserted over the insulation support pins 50 then the insulation retaining channel 70 is pressed on to the insulation support pins 50 securing the insulation to the wall. The alignment grommet flanges 34 and 34a and the two raised alignment ridges/protrusions 19 facilitate proper alignment of the ICB form 10 since the flanges 34/34a fit in between the two raised alignment ridges/protrusions 19 of a first block and the notch 16 of another block adjacent to the first block as shown in FIG. 5 (where the first block is the upper left block and the second block is the bottom left block). This is repeated for all blocks so that they are all interconnected and so that there is a continuous horizontal hollow cavity extending left-to-right (or right-to-left) allowing mechanical communication horizontally in the wall when the blocks are connected together.

Figure 11:
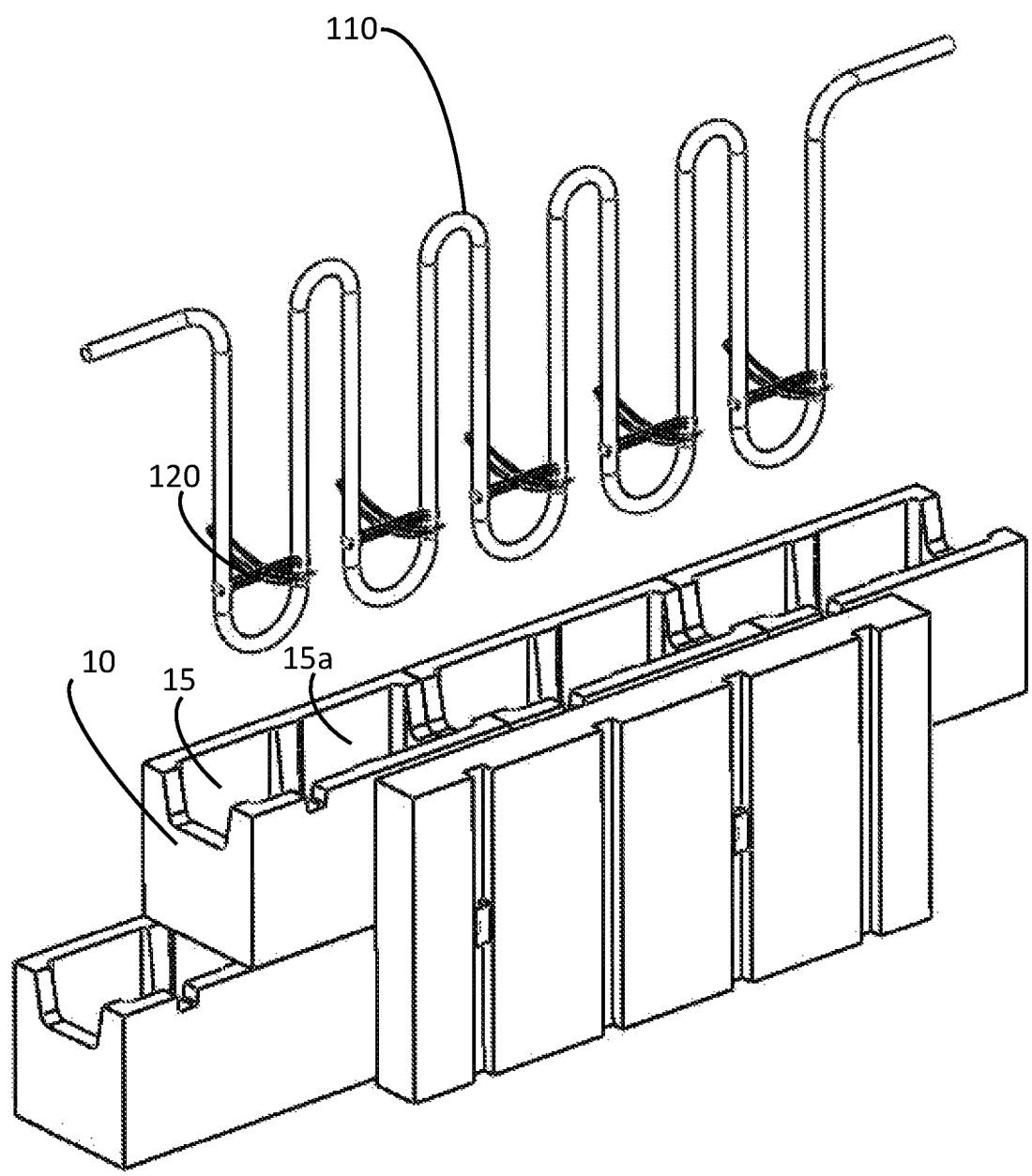
FIG. 11 is a perspective view of the tube and wall assembly according to one embodiment.

Referring to FIG. 11, the polymer water tubing 110 assembly may be pre-bent in a serpentine configuration so it is able to be inserted into the ICB form 10 cavities 15 and/or 15a. Based on heating loads, it may not be necessary to have a polymer water tube or air tube disposed in all block cavities. The length of the polymer water tube or air tube serpentine loop may vary depending on the height of the walls. The diameter of the polymer water tube or air tube may vary according to the heating and cooling demand and distance of the pipe run. To facilitate the alignment of the polymer water tube assembly, a tube spacing and alignment device is attached to the tubing 120.

It is noted that the tubing will rest on connecting portions 13 of the top blocks of the wall when connected.

Figure 12:
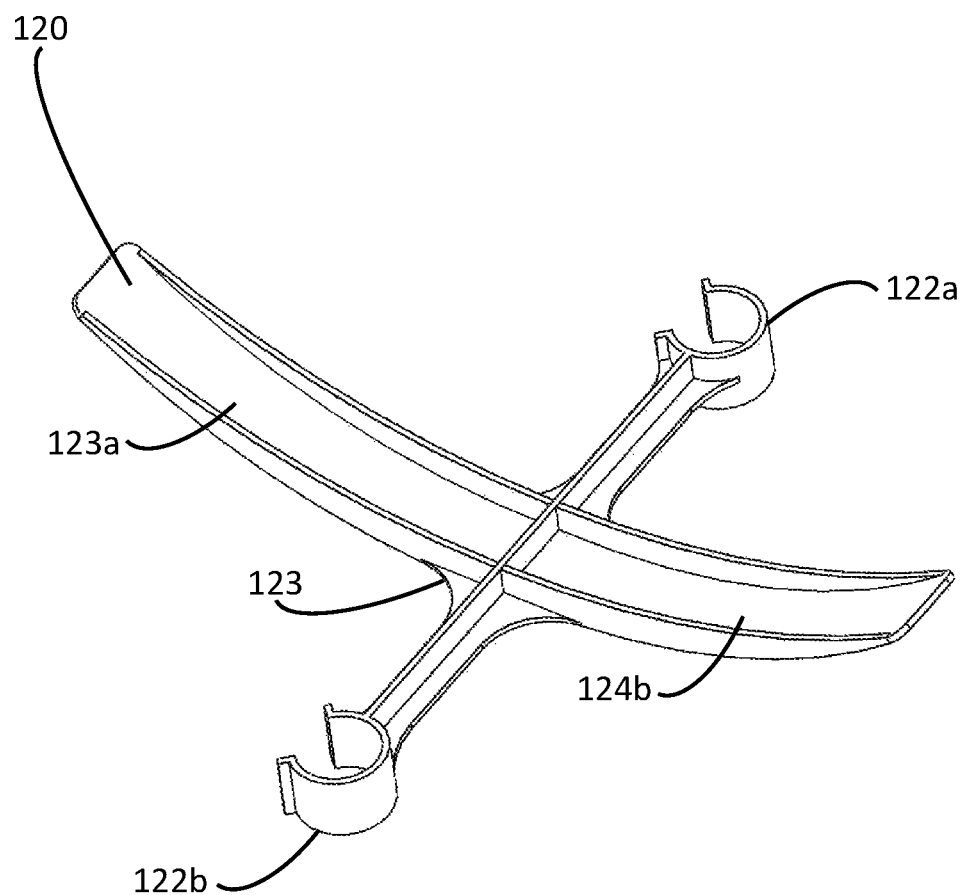
FIG. 12 is a perspective view of the tube spacing and guide device according to one embodiment.

Referring to FIG. 12, a tube spacing and guide device 120 may be attached to the polymer water tube or air tube 110 to maintain the appropriate loop diameter while inserting the polymer water tube or air tube in to the ICB form cavities.

The tube spacing and guide device 120 is preferably composed of a semi-rigid polymer (but not limited to) and is configured with two ends 122B and 122b each forming an incomplete loop and connected together the body of the device 123. The incomplete loop of each end 122B and 122b is configured to snap over and partially encase the tubing 110 in a manner so as to firmly secure and maintain the spacing of the individual legs of a polymer water or air tube loop.

Protruding from the body 123 of the tube spacing and guide device 120 are at least two appendages (preferably two or more) 124a and 124b and when positioned with the polymer water or air tube in a vertical position for insertion into the wall cavities FIGS. 11, 15 and 15a the appendages 124a and 124b would protrude in opposite directions toward the sides of 11 and 11a (FIG. 2A) of the ICB form and would extend either horizonal or preferably in an upward direction so as to facilitate easy insertion into the ICB. The length of each guide appendage may vary with the diameter of the ICB form being utilized, however the guide appendages 124a and 124b are designed to be flexible and provide some resistance against the inside of the block cavity so as to generally maintain the polymer water tube in the center of the ICB form cavity.

Referring to FIG. 1 the polymer water or air tubing assembly 110 and tube spacing and guide device 120 attached to the polymer water or air tubing is lowered into the cavities 15 and 15a of the ICB wall with the open ends of the tubing extending from the wall. It should be noted that not all ICB cavities may contain polymer or metal tubing. This illustration shows the tubing ends extending from the top of the wall, however the ends may protrude wherever necessary for attachment to the heating system. Concrete is then pumped into the ICB cavities 15 and 15a completing the construction of the ICB thermal wall. The insulation retaining channel is ready to accept any conventional exterior façade and the interior is ready to accept suitable finishes and façades.

Referring to FIG. 1, illustrating a wall building structure ("wall") 130 that is constructed from a plurality of modular form members/blocks 10 that are interconnect to form a monolithic structure. As illustrated, the plurality of modular form members 10 are stacked upon and placed adjacent to each other in order to construct the building structure 130. Concrete may then be placed in the form and allowed to sufficiently harden.

Below is a general discussion of embodiments of the present disclosure:

Exemplary Embodiment 1: Components of the ICB Thermal Wall System:
  1. Blocks
  2. Alignment grommet
  3. Insulation support pin
  4. Insulation retaining channel
  5. Insulation/Insulation board
  6. Tubing
  7. Tube spacing and guide device Functions of the ICB According to Exemplary Embodiment 1 (and Other Exemplary Embodiments):
  1. The horizontal and diagonal flow of concrete enable by the lower center crossmember.
    a. The monolithic structural strength is increased.
    b. The thermal communication as a result of the concrete flowage is more efficient.
  2. The design and use of the ICB as block form with thinner side walls and crossmembers to facilitate lighter blocks (as opposed to heavy CMUs).

3. The increased density of the ICB concrete material to facilitate thermal conductance.
4. The block form alignment system enabled by the use of the
   a. notch in the block
      i. The taper in the notch to ensure the alignment can only be inserted in one way
   b. the alignment grommet that goes in the notch
      i. the flanges on the grommet that helps align each ICB in a front to back direction.
      ii. The inner and upper grommet flange, in coordination with the ICB alignment ridges 19 on the inside of the ICB cavity to facilitate proper left to right alignment of the ICBs
      iii. The taper on the alignment grommet that ensures it can only go on one way.
      iv. The flanges on the inner and outer sides of the block to secure the grommet in place.
   c. the alignment ridges 19 on the inside of the ICB.
      i. which seat over the flange on the alignment grommet.
      ii. to facilitate proper left to right alignment of the ICBs.
   d. the ability to dry stack the ICBs instead of utilizing a mortar bed.
5. The wall connection system which utilizes the:
   a. Alignment grommet as an anchoring system to the ICB for anchoring the insulation to the building
      i. The alignment grommet has an aperture.
      ii. The alignment grommet has the configuration to hold the insulation support pin.
   b. The insulation support pin which supports the insulation.
      i. Has a configuration to insert and attach to the alignment grommet.
      ii. Physically anchor the insulation in place.
      iii. Physically guide the insulation into the proper location.
   c. The insulation board
      i. Which has a hole pattern which matches the alignment grommet and insulation support pin system
      ii. Which has channels cut to facilitate insertion of the insulation retaining channel
   d. The insulation support pin which connects to the insulation retaining channel
      i. The insulation support pin has a configuration to snap into and retain the insulation retaining channel
   e. The insulation retaining channel having a configuration to connect to and be secured to the insulation support pin
      i. The insulation retaining channel is configured to seat in the channels cut in the insulation
      ii. In a manner that made the insulation retaining channel flush with exterior face of the blocks
6. The insulation restraining channel is the medium used to connect exterior façades to the exterior of the ICB building
7. The tubing may be bent in a serpentine pattern so as to be inserted into the cavities of the ICB
   a. Through the transport of fluids through the tubes, thermal transfer for either heating or cooling is achieved.
8. Tube spacing and guide device is utilized to ensure the tube spacing is maintained to facilitate insertion into the tube into the ICB wall.
   a. The tube spacing and guide device is configured to snap on to the tube
   b. The tube spacing and guide device is configured with appendages so as to ensure the tube is disposed of in the central portion of the cavity.

A precut area in the block for one of more receptacles.

Exemplary Components of the ICB

As referred to herein in some embodiments, a "block form" may be distinguished from (but is not limited in this manner) a concrete block of concrete masonry unit (CMU). CMUs themselves are structurally supporting the block form may or may not be in itself structurally supportive so we reference it a "form" in which concrete will be poured into.

Each block (or "block form") is also referred to herein as an Insulated Concrete Block (ICB) as a way to compare it to an Insulated Concrete Form (ICF) (according to some embodiments)

Exemplary Components of the ICB:

The lower center wall within each block (and at least one lower sidewall) is one component which provides an advantage. Without this feature the ICB will likely not be as structurally sound or does not work in the same manner as the present disclosure (e.g., because the height is not reduced relative to the sidewalls). This enables the horizontal and diagonal flow of concrete for monolithic strength and thermal conductivity.

The notch (primary) provides advantages because it holds the alignment grommet which is also advantageous for ensuring the blocks are properly installed (in alignment). This notch in conjunction with the alignment grommet serves a couple of purposes discussed below.

The taper on the notch is a dependent claim

The two raised alignment ridges (appendages) (primary) work in coordination with the notch and alignment grommet to ensure block form alignment from right to left.

The density of the concrete material in the ICB compared to traditional CMUs is more, providing for essential thermal heat transfer.

The reduced wall and center crossmember thickness for easier handling

The ability to dry stack the ICBs system

Exemplary Components of the Alignment Grommet:

Flanges which wrap around the inner and outer walls of the ICB to secure the grommet in place To facilitate proper alignment of the ICBs from a front to back direction (perpendicular to the vertically extending tubing and perpendicular to the longitudinal length of the block)

In coordination with ICB, the alignment ridges to facilitate proper alignment from left to right (horizontal direction—which is (perpendicular to the vertically extending tubing and along the longitudinal length of the block)) of the ICBs Configured to lock on to the insulation support pin Tapered to only fit in the notch one way Exemplary Components/Functions of the Insulation Support Pin:

To support the rigid insulation panels

To properly position, align the rigid insulation panels

Configured to anchor into the alignment grommet

Configured to anchor into the insulation retaining channel

Exemplary components of the insulation retaining channel

To retain the rigid insulation boards to insulation support pins and ICB wall

To anchor into the insulation support pin

To act as a medium for screws to anchor exterior facades to the ICB wall system

Exemplary Components of the Rigid Insulation Board

Configured with apertures corresponding with the insulation support pins for attachment to the ICB wall Configured with vertical channel apertures to conceal the insulation retaining channel Exemplary Component of Pre-Bent Polymer or Metal Tubing:

Pre-bent in a precise serpentine pattern to facilitate insertion into the ICB wall cavities Through the transport of fluids through the tubes, thermal transfer for either heating or cooling is achieved.

Exemplary Component of Tube Spacing and Guide Device

To secure the tubing in a proper serpentine pattern for insertion into the wall cavities (minimizing labor and reducing time)

To reduce or eliminate damage to the tubing when inserting into the ICB wall cavities To ensure the tubing is disposed in the central area of the ICB wall cavity Exemplary Steps of an Exemplary Method 1. A wall structure to provide both heating and cooling, comprising:
a plurality of concrete forms that are stacked upon and placed adjacent to each other in order to construct the wall structure, wherein each block form includes at least one cell, and wherein said block forms are stacked such that said at least one cell is in alignment, a pre-bent hydronic or air tubing configured to be vertically inserted into the aligned cells of the aligned form members.

2. wherein each block form includes a at least one center crossmember of reduced height.

3. wherein each block form includes at least one end side wall of reduced height.

4. wherein each block form includes an at least two appendages on the bottom of the inside cavity of the exterior side wall configured to accept the flange of the alignment grommet.

5. wherein each block form is configured with a notch on the top of the exterior side of the block form to accept the alignment grommet.

6. wherein the body of an alignment grommet device configured to insert in the notch and fit flush with the top side of the block form.

7. Wherein the alignment grommet has flanges on each end that form around the block form extending beyond the body of alignment grommet.

8. Wherein the flanges of the alignment grommet create a lip securing the alignment grommet in place in the notch of the block form 9. Wherein the alignment grommet flange facilitates alignment of the ICBs in a front to back direction.

10. Wherein the top portion of flange of the alignment grommet on the interior of the cavity is configured to fit the appendages of claim facilitating left to right ICB alignment 11. Where in the alignment grommet has an aperture on the exterior side of the block form for receiving an appendage 12. Wherein an insulation retaining pin is configured to be inserted in to the aperture of the alignment grommet alignment grommet and anchor in place 13. Wherein rigid insulation board is configured with apertures to receive the appendages of the insulation support pin 14. Where as the rigid insulation board had vertical aperture cut in the exterior face of the rigid insulation board located in parallel with the apertures in the rigid insulation board 15. Where in the vertical aperture channel of claim 13 is configured to the receive the insulation retaining channel and anchor in place 16. Whereas the rigid insulation board when inserted over the appendage on the insulation support pins, the insulation support pin appendage extends through and beyond the exterior face of the channel in the rigid insulation board.

17. Whereas the insulation retaining channel is configured with a vertical aperture to accept the insulation retaining channel flush with the surface of the exterior of the rigid insulation board 18. Whereas the insulation retaining channel is the medium in which screws anchor exterior facades to 19. Whereas water or air tubes are bent in a specific serpentine pattern so as to be acceptable for vertical insertion into the ICB cavities 20. Whereas through the transport of fluids through the tubes, thermal transfer for either heating or cooling is achieved.

21. Whereas a tube spacing and guide device is attached to the polymer or metal tubing to secure the serpentine pattern facilitating insertion of the tubing into the ICB wall 22. Whereas a tube spacing and guide device is attached to the polymer or metal tubing to facilitate proper positioning of the tubing in the central portion of the ICB cavity.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Any flowcharts and block diagrams in the Figures illustrate possible implementations of systems and methods according to various embodiments of the present invention. It should also be noted that, in some alternative implementations, the functions noted in the block may occur out of the order noted in the figures and/or in the above description. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

The invention claimed is:

1. A system comprising:
a plurality of blocks configured to interconnect with each other, each of the blocks comprising two end walls and two side walls surrounding and defining an interspatial cavity, the interspatial cavities of the plurality of blocks combine to form a series of vertical interior cavities that each extend from a top of the plurality of blocks to a bottom of the plurality of blocks, wherein a top plain surface height of each of the end walls of the block is lower in height than a top plain surface of the side walls, and wherein for each block: a connecting wall is disposed between the two end walls with a height of the connecting wall being lower than the height of the top plain surface of the two end walls.

2. The system of claim 1, wherein the height of both the connecting wall and the at least one of the end walls are lower in height than a height of other side walls of the block, such that when the plurality of blocks are interconnected, at least one cavity is formed by the connecting walls and the at least one of the end walls of interconnected blocks that are horizontally adjacent to each other, thereby allowing flow of material with the interconnected adjacent blocks.

3. The system of claim 1, further comprising a grommet, wherein each block includes a notch and a pair of ridges, wherein the grommet is configured to be inserted into the notch of a first block and a flange of the grommet is configured to be disposed between the pair of ridges of a second block, thereby connecting the first and second blocks together.

4. The system of claim 3, wherein the grommet is configured to receive an insulation support pin that locks in place inside the grommet and acts as a support system for a rigid insulation board or other exterior facades.

5. The system of claim 4, wherein the insulation support pin locks into the grommet and acts as a support and attachment system for the insulation, the insulation comprising an insulation board that comprises a pinning/attachment system on a distal end from the grommet which locks into an insulation retaining channel that holds the ridged insulation board in place.

6. The system of claim 5, further comprising an insulation retaining channel configuration which allows the support pin to snap on the insulation, holding the rigid insulation board in place, while providing an attachment medium for all forms of exterior facades.

7. The system of claim 6, wherein the insulation board comprises holes in a configuration corresponding to locations of installed grommets in the plurality of blocks, wherein insulation support pins are inserted into the holes within grooves on an exterior of the insulation board to accept the insulation retaining channel and be recessed with a surface of the insulation board.

8. The system of claim 1, further comprising tubing that vertically extends through the series of vertical interior cavities, wherein the tubing comprises a pre-bent polymer water tube in such a configuration so as to be able to be inserted vertically into the at least one cavity of the plurality of blocks so as to provide at least one wall of the plurality of blocks with thermal heat or cooling.

9. The system of claim 1, further comprising tubing that vertically extends through the series of vertical interior cavities, wherein the tubing comprises a pre-bent metal tube in such a configuration so as to be able to be inserted vertically into the at least one cavity of the plurality of blocks so as to provide at least one wall of the plurality of blocks with thermal heat or cooling.

10. The system of claim 1, further comprising tubing that vertically extends through the series of vertical interior cavities, and a tube spacing and guide device configured to attach on the tubing in order to maintain the tubing at a uniform distance apart from each other and to provide a guide system to maintain the tubing at desired distance from inner cell walls when inserted into the plurality of blocks.

11. The system of claim 1, further comprising insulation that is configured to be attached to an exterior surface of the blocks so as to retard thermal loss from the exterior side of the exterior facing block and reflect thermal energy towards an opposing side of the block.

12. The system of claim 1, further comprising preformed tubing in a S-shaped pattern, wherein the preformed tubing is configured to be vertically inserted into the vertical interior cavities, when the plurality of blocks are stacked with each other, so that the preformed tubing extends from the top of the plurality of blocks to the bottom of the plurality of blocks.

13. A system comprising:
a plurality of blocks configured to interconnect with each other each having interspatial connected cavities forming a monolithic wall when filled with material, the plurality of blocks forming a series of vertical interior cavities that each extend from a top of the plurality of blocks to a bottom of the plurality of blocks, the vertical interior cavities configured to receive tubing to vertically extend through the series of vertical interior cavities, each of the plurality of blocks comprises:
a notch configured to receive an alignment grommet; and a pair of ridges configured to receive a portion of the grommet when the grommet is installed in a notch of another block;

an insulation board that is configured to be attached to the grommet on an exterior surface of the blocks.

14. The system of claim 13, wherein the insulation board is attached to the grommet using a plurality of pins, whereby a first end of each respective pin is inserted into a respective hole in the insulation board and a second end of the respective pin is attached to a respective corresponding grommet.

15. A system comprising:

a plurality of blocks configured to interconnect with each other each having interspatial connected cavities, the plurality of blocks forming a series of vertical interior cavities that each extend from a top of the plurality of blocks to a bottom of the plurality of blocks;

wherein each block includes a notch, and wherein a grommet is configured to be inserted into the notch of a first block and a flange of the grommet is configured to be disposed between a pair of protrusions extending from one of the side walls of a second block, thereby connecting the first and second blocks together.

16. The system of claim 15, wherein the grommet is configured to receive an insulation support pin that locks in place inside the grommet and acts as a support system for a rigid insulation board.

17. The system of claim 16, wherein the insulation support pin locks into the grommet and acts as a support and attachment system for the insulation, the insulation comprising an insulation board that comprises a pinning/attachment system on a distal end from the grommet which locks into an insulation retaining channel that holds the ridged insulation board in place.

18. The system of claim 17, further comprising an insulation retaining channel configuration which allows the support pin to snap on the insulation, holding the rigid insulation board in place, while providing an attachment medium for all forms of exterior facades.

19. The system of claim 18, wherein the insulation board comprises holes in a configuration corresponding to locations of installed grommets in the plurality of blocks, wherein insulation support pins are inserted into the holes within grooves on an exterior of the insulation board to accept the insulation retaining channel and be recessed into the surface of the insulation board.

20. A system comprising:

a plurality of blocks configured to interconnect with each other each having interspatial connected cavities, the plurality of blocks forming a series of vertical interior cavities that each extend from a top of the plurality of blocks to a bottom of the plurality of blocks; and tubing that vertically extend through the series of vertical interior cavities;

wherein a tube spacing and guide device are configured to attach on the tubing in order to maintain the tubing at a uniform distance apart from each other and to provide a guide system to maintain the tubing at desired distance from inner cell walls when inserted into the plurality of blocks.

* * * * *